United States Patent
Hiyama et al.

(10) Patent No.: US 9,204,072 B2
(45) Date of Patent: Dec. 1, 2015

(54) PHOTOELECTRIC CONVERSION DEVICE, IMAGING SYSTEM, PHOTOELECTRIC CONVERSION DEVICE TESTING METHOD, AND IMAGING SYSTEM MANUFACTURING METHOD

(71) Applicant: CANON KABUSHIKI KAISHA, Tokyo (JP)

(72) Inventors: Hiroki Hiyama, Sagamihara (JP); Kohichi Nakamura, Kawasaki (JP); Kazuo Yamazaki, Yokohama (JP); Kazuhiro Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 14/042,097

(22) Filed: Sep. 30, 2013

(65) Prior Publication Data

US 2014/0092286 A1 Apr. 3, 2014

(30) Foreign Application Priority Data

Oct. 2, 2012 (JP) ................................ 2012-220387

(51) Int. Cl.
*H04N 5/378* (2011.01)
*H04N 5/3745* (2011.01)
*H04N 17/00* (2006.01)

(52) U.S. Cl.
CPC ............ *H04N 5/378* (2013.01); *H04N 5/3745* (2013.01); *H04N 17/002* (2013.01)

(58) Field of Classification Search
None
See application file for complete search history.

(56) References Cited

U.S. PATENT DOCUMENTS

| 6,963,369 | B1 * | 11/2005 | Olding | 348/241 |
|---|---|---|---|---|
| 7,129,883 | B2 * | 10/2006 | Muramatsu et al. | 341/164 |
| 7,233,277 | B2 * | 6/2007 | Roh | 341/169 |
| 7,362,355 | B1 * | 4/2008 | Yang et al. | 348/222.1 |
| 7,522,199 | B2 * | 4/2009 | Funakoshi et al. | 348/245 |
| 7,570,293 | B2 * | 8/2009 | Nakamura | 348/308 |
| 7,659,925 | B2 * | 2/2010 | Krymski | 348/222.1 |
| 8,035,717 | B2 * | 10/2011 | Hisamatsu | 348/308 |
| 8,907,294 | B2 * | 12/2014 | Kameshima et al. | 250/394 |
| 2006/0152597 | A1 * | 7/2006 | Shimizu | 348/222.1 |
| 2008/0259164 | A1 | 10/2008 | Taura | |
| 2009/0190015 | A1 * | 7/2009 | Bechtel et al. | 348/302 |
| 2009/0237534 | A1 * | 9/2009 | Okumura | 348/294 |
| 2010/0194949 | A1 * | 8/2010 | Hisamatsu | 348/302 |
| 2010/0245631 | A1 * | 9/2010 | Hoda et al. | 348/241 |
| 2010/0265374 | A1 * | 10/2010 | Nishi | 348/302 |
| 2010/0283881 | A1 * | 11/2010 | Araki et al. | 348/308 |
| 2011/0074994 | A1 * | 3/2011 | Wakabayashi et al. | 348/302 |
| 2011/0176042 | A1 * | 7/2011 | Kato et al. | 348/294 |
| 2012/0292485 | A1 * | 11/2012 | Kasuga et al. | 250/208.1 |
| 2013/0057744 | A1 * | 3/2013 | Minagawa et al. | 348/311 |
| 2013/0335609 | A1 * | 12/2013 | Higuchi et al. | 348/302 |

FOREIGN PATENT DOCUMENTS

JP 2008-270433A 11/2008

* cited by examiner

*Primary Examiner* — Michael Osinski
(74) *Attorney, Agent, or Firm* — Canon USA, Inc. I.P. Division

(57) ABSTRACT

A photoelectric conversion device includes a pixel array including a plurality of pixels arranged in a matrix, a plurality of blocks including a plurality of pairs, each of the pairs including a comparator provided correspondingly with a column in the pixel array and a memory provided correspondingly with the comparator, and a block information supply unit configured to supply block information which indicates a location of a block, to the plurality of memories included in the blocks.

9 Claims, 13 Drawing Sheets

PHOTOELECTRIC CONVERSION DEVICE, IMAGING SYSTEM, PHOTOELECTRIC CONVERSION DEVICE TESTING METHOD, AND IMAGING SYSTEM MANUFACTURING METHOD

BACKGROUND

1. Technical Field

The present disclosure relates to a photoelectric conversion device and an imaging system.

2. Description of the Related Art

A solid state imaging element having an analog/digital (A/D) converter and a memory which holds an A/D conversion result in each of pixel columns is known. Japanese Patent Application Laid-Open No. 2008-270433 discusses a configuration in which a plurality of memories is divided into a plurality of blocks and a column scan circuit is provided to each block. In the configuration discussed in Japanese Patent Application Laid-Open No. 2008-270433, a partial area in an imaging area can be extracted by reading a signal only from a memory belonging to a certain block. If a signal is read from a certain block, however, circuits in subsequent stages cannot distinguish from which block the signal is read.

SUMMARY OF THE INVENTION

According to an aspect of the present invention, a photoelectric conversion device includes a pixel array including a plurality of pixels arranged in a matrix, a plurality of blocks including a plurality of pairs, each of which includes a comparator provided correspondingly with a column in the pixel array and a memory provided correspondingly with the comparator, and a block information supply unit configured to supply block information for distinguishing between a signal read from one block among the plurality of blocks and a signal read from another block, to the plurality of memories included in the blocks.

According to another aspect of the present invention, in a testing method for a photoelectric conversion device, the photoelectric conversion device includes a pixel array including a plurality of pixels arranged in a matrix form, a plurality of blocks including a plurality of pairs, each of which includes a comparator provided correspondingly with a column in the pixel array and a memory provided correspondingly with the comparator, and a block information supply unit configured to supply block information for distinguishing between a signal read from one block among the a plurality of blocks and a signal read from another block, to the plurality of memories included in the blocks, the testing method includes comparing a preset expected value with the block information output from the photoelectric conversion device, and determining whether the expected value coincides with the block information.

Further features of the present invention will become apparent from the following description of exemplary embodiments (with reference to the attached drawings).

DESCRIPTION OF THE EMBODIMENTS

Figure 1:
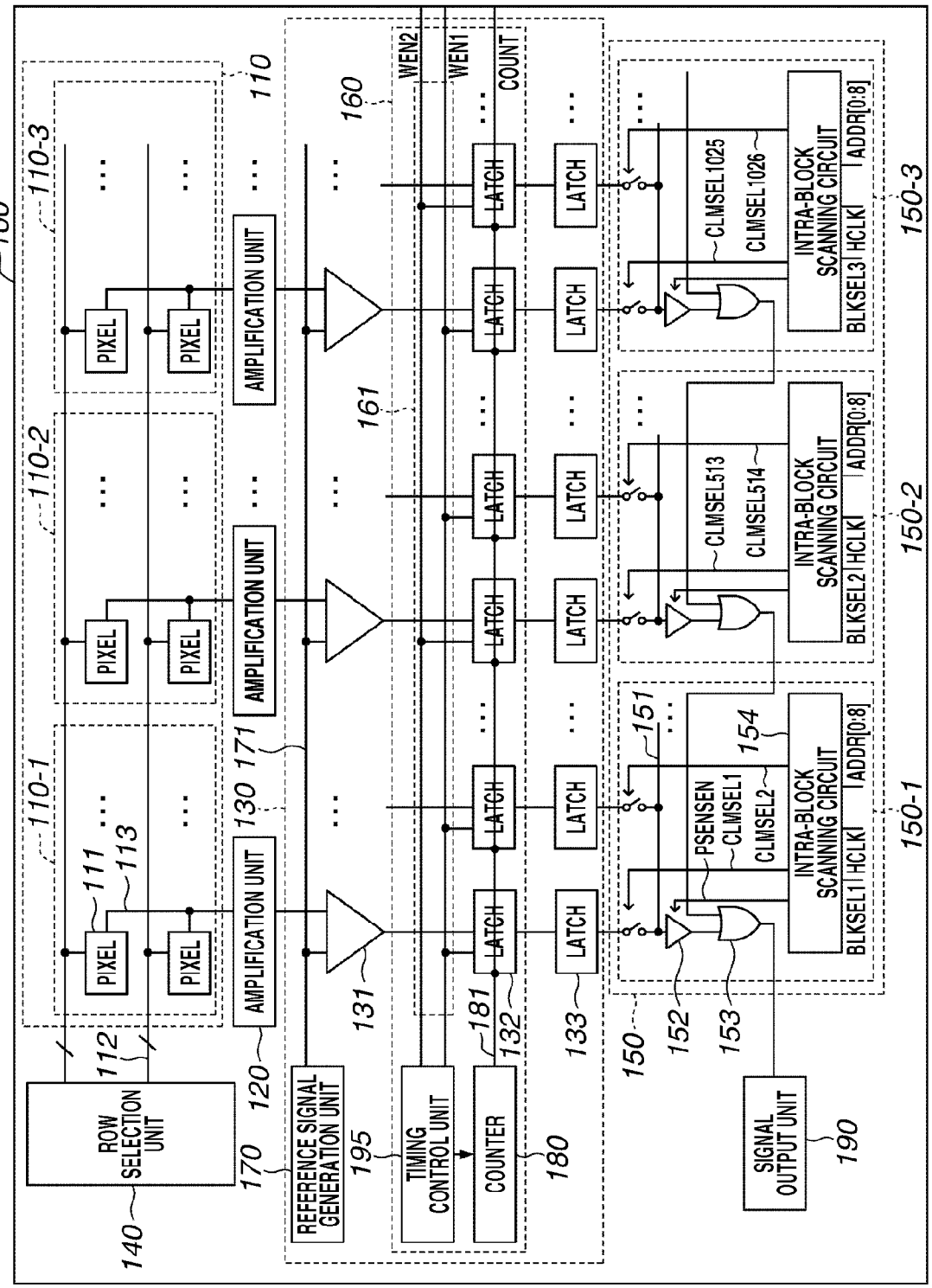
FIG. 1 is a block diagram illustrating a configuration of a photoelectric conversion device according to a first exemplary embodiment.

Various exemplary embodiments, features, and aspects of the invention will be described in detail below with reference to the drawings. Throughout a plurality of drawings, common components are denoted by like reference characters, and duplicated description will be omitted.

A first exemplary embodiment will now be described with reference to drawings.

FIG. 1 illustrates a photoelectric conversion device 100 according to the present exemplary embodiment. The photoelectric conversion device 100 includes a pixel array 110, amplification units 120, an A/D conversion unit 130, a row selection unit 140, a block output unit 150, and a signal output unit 190.

The pixel array 110 includes a plurality of pixels 111 arranged in a matrix. A plurality of pixels 111 belongings to the same column is connected to a column signal line 113 in common. A signal output from one of the pixels 111 to the column signal line 113 is input to the A/D conversion unit 130 via the amplification unit 120 provided on each column.

The A/D conversion unit 130 includes a block information supply unit 160, a reference signal generation unit 170 connected to a plurality of comparators 131 in common, a timing control unit 195, and a counter 180. The A/D conversion unit 130 includes a comparator 131, a first latch circuit 132, and a second latch circuit 133 in each of pixel columns. The comparator 131 outputs a comparison result signal, which indicates a magnitude relation between an output of the amplification unit 120 and a reference signal supplied from the reference signal generation unit 170. The timing control unit 195 causes the counter 180 to start a count operation in synchronism with start of a change of the reference signal output from the reference signal generation unit 170. The timing control unit 195 controls an operation of the counter 180 and in addition supplies write signals WEN1 and WEN2 to the first latch circuit 132. The first latch circuit 132 holds an output of the counter 180 by using the comparison result signal or the write signal WEN1 or WEN2 as a trigger. The second latch circuit 133 holds an output of the first latch circuit 132.

A signal line group, which supplies the write signals WEN1 and WEN2, constitutes a part of the block information supply unit 160.

Each of block output units 150-1, 150-2, 150-3, ... is provided in common to a plurality of second latch circuits 133. In the present exemplary embodiment, a block output unit 150 is provided for each block having eight columns as a unit. In the present disclosure, components having a branch number like 150-1 are generally described as 150. The block output unit 150 includes a block output line 151, a sense amplifier 152, an OR circuit 153, and an intra-block scanning circuit 154. The sense amplifier 152 is connected to a plurality of corresponding second latch circuits 133 via the block output line 151. The intra-block scanning circuit 154 selectively supplies an output of a second latch circuit 133 to the sense amplifier 152, and in addition switches the sense amplifier 152 to on or off. The OR circuit 153 that is a selective-output unit selectively outputs an output of the sense amplifier 152 or an output of an OR circuit 153 in another block output unit. Owing to this configuration, a signal held by the second latch circuit 133 is transmitted to the signal output unit 190 via the sense amplifier 152 in a corresponding block and at least one OR circuit. In other words, in the photoelectric conversion device 100 described heretofore, the pixel array 110 is divided into three areas and pixels in respective areas are associated with the block output units 150.

Figure 2:
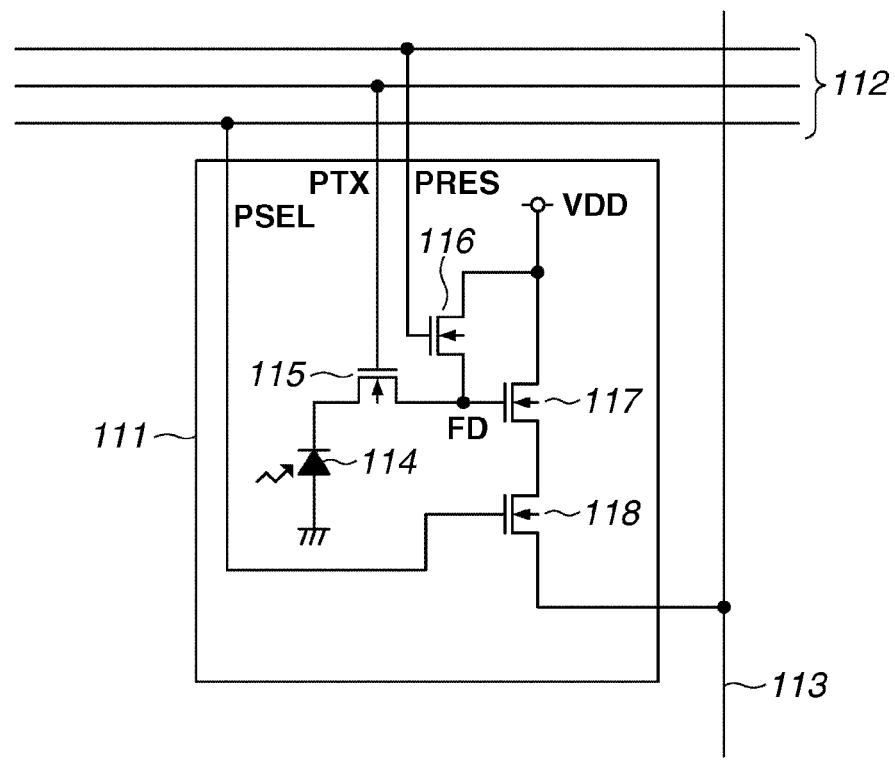
FIG. 2 is an equivalent circuit diagram illustrating a configuration of a pixel.

FIG. 2 is an equivalent circuit diagram illustrating a configuration example of the pixel 111. The pixel 111 includes a photodiode 114, which performs photoelectric conversion, and a plurality of transistors. The photodiode 114 is connected to a floating diffusion portion FD via a transfer transistor 115. The floating diffusion portion FD is connected to a voltage source VDD via a reset transistor 116, and the floating diffusion portion FD is connected to a control electrode of the amplification transistor 117 as well. The amplification transistor 117 is connected at a first main electrode thereof to the voltage source VDD, and connected at a second main electrode thereof to the column signal line 113 via a row selection transistor 118. The row selection unit 140 supplies a control signal PSEL to a control electrode of the row selection transistor 118. The row selection unit 140 supplies a control signal PRES to a control electrode of the reset transistor 116. The row selection unit 140 supplies a control signal PTX to a control electrode of the transfer transistor 115. If the selection transistor 118 turns on, the amplification transistor 117 constitutes a source follower circuit in conjunction with a constant current source (not illustrated) connected to the column signal line 113.

Figure 3:
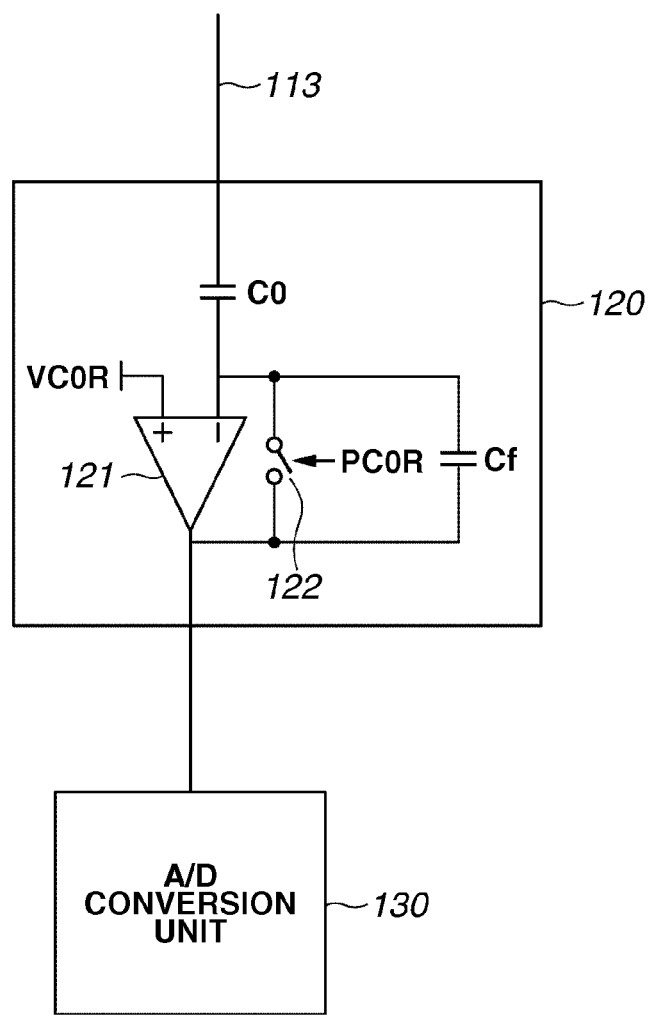
FIG. 3 is an equivalent circuit diagram illustrating a configuration of an amplification circuit.

FIG. 3 is an equivalent circuit diagram illustrating a configuration example of the amplification unit 120. The amplification unit 120 includes an amplifier 121, an input capacitance C0, a feedback capacitance Cf, and a switch 122, and constitutes an inversion amplifier. An inverting input terminal of the amplifier 121 is connected to the column signal line 113 via the input capacitance C0. A non-inverting input terminal of the amplifier 121 is connected to a voltage source VCOR. An output terminal of the amplifier 121 is connected to the A/D conversion unit 130. Furthermore, the feedback capacitance Cf and the switch 122 are connected in parallel between the inverting input terminal and the output terminal of the amplifier 121. Since a clamp circuit is constituted in this way, the amplification unit 120 amplifies a signal that is input via the column signal line 113 with a ratio between capacitance value of the feedback capacitance Cf and the input capacitance C0, and outputs a resultant signal.

Figure 4:
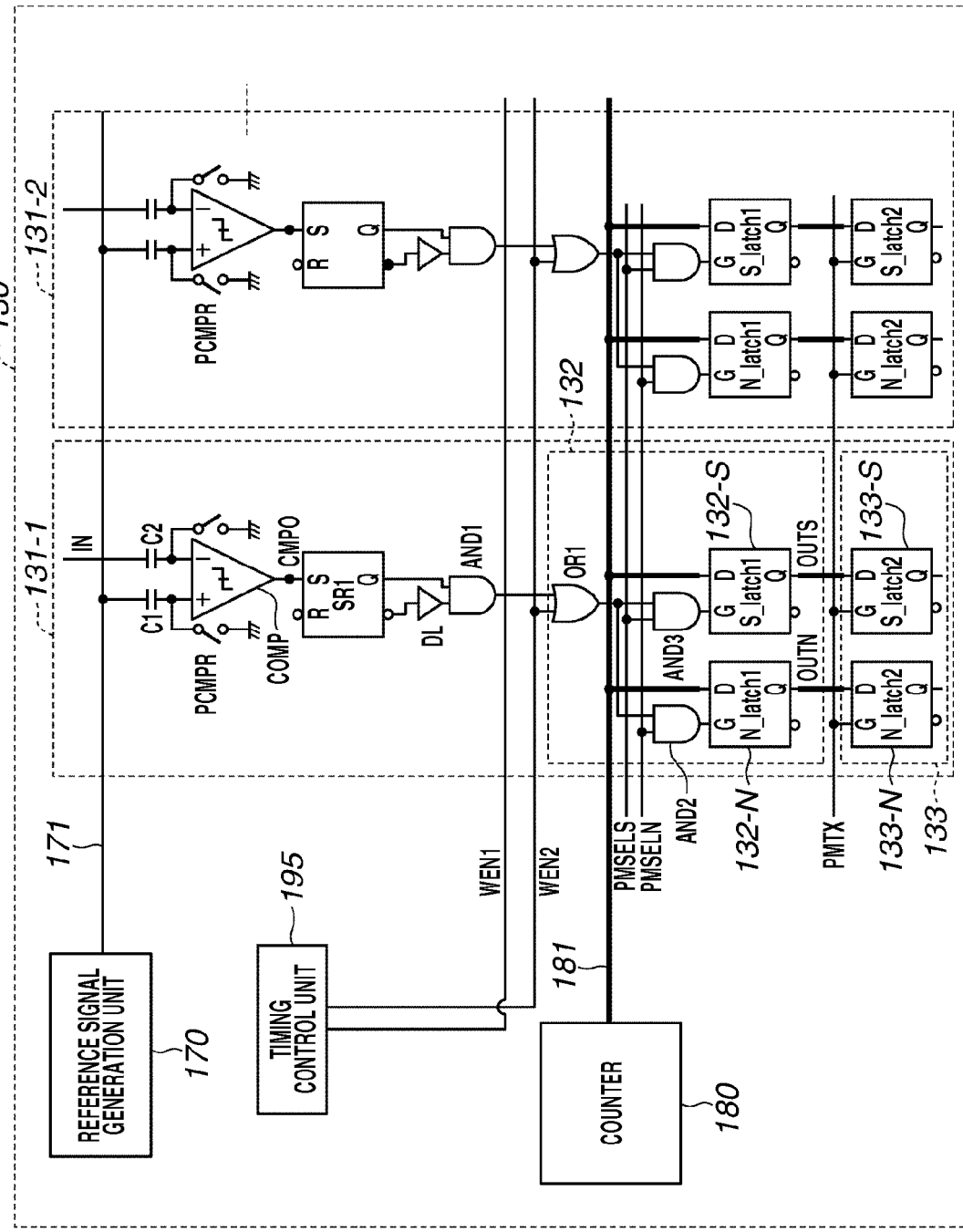
FIG. 4 is an equivalent circuit diagram illustrating a configuration of an A/D conversion unit.

FIG. 4 is a diagram illustrating a configuration example of the A/D conversion unit 130. In FIG. 4, the A/D conversion unit 130 corresponding to two columns is illustrated in addition to the reference signal generation unit 170, the counter 180, and the timing control unit 195.

The A/D conversion unit 130 includes the comparator 131, the first latch circuit 132, and the second latch circuit 133. The comparator 131 includes a comparison circuit COMP, capacitances C1 and C2, switches PCMPR, an set-reset (SR) latch circuit SR1, a delay element DL, and an AND circuit AND1.

An input terminal IN of the comparator 131 is connected to the amplification unit 120. One of input terminals of the comparison circuit COMP is connected to the reference signal generation unit 170 via the capacitance C1. The other of the input terminals is connected to the input terminal IN via the capacitance C2. Furthermore, the input terminals of the comparison circuit COMP are connected to a power supply via switches. An output terminal CMPO of the comparison circuit COMP is connected to an S terminal of the SR latch circuit SR1. A non-inverted output terminal of the SR latch circuit SR1 is connected to one of input terminals of the AND circuit AND1. An inverted output terminal of the SR latch circuit SR1 is connected to the other of the input terminals of the AND circuit AND1 via the delay element DL. An output terminal of the AND circuit AND1 is connected to the first latch circuit 132.

The first latch circuit 132 includes an OR circuit OR1, AND circuits AND2 and AND3, and latch circuits N_latch1 and S_latch1. One of input terminals of the OR circuit OR1 is connected to the output terminal of the AND circuit AND1. The other of the input terminals of the OR circuit OR1 is connected to the timing control unit 195. An output terminal of the OR circuit OR1 is connected to one of input terminals of the AND circuit AND2 and one of input terminals of the AND circuit AND3. The other of the input terminals of the AND circuit AND2 is connected to a signal line which transmits a signal PMSELN. The other of the input terminals of the AND circuit AND3 is connected to a signal line that transmits a signal PMSELS. The latch circuit N_latch1 is connected at a D terminal thereof to the counter 180, and connected at a G terminal thereof to an output terminal of the AND circuit AND2. The latch circuit S_latch1 is connected at a D terminal thereof to the counter 180, and connected at a G terminal thereof to an output terminal of the AND circuit AND3.

The second latch circuit 133 includes latch circuits N_latch2 and S_latch2. D terminals of the latch circuits N_latch2 and S_latch2 are connected to the latch circuits N_latch1 and S_latch1, respectively. G terminals of the latch circuits N_latch2 and S_latch2 are connected to an interconnection that transmits a signal PMTX. Although only latch circuits corresponding to one bit in each column are illustrated, as many latch circuits as the number of bits in the counter are provided.

Figure 5:
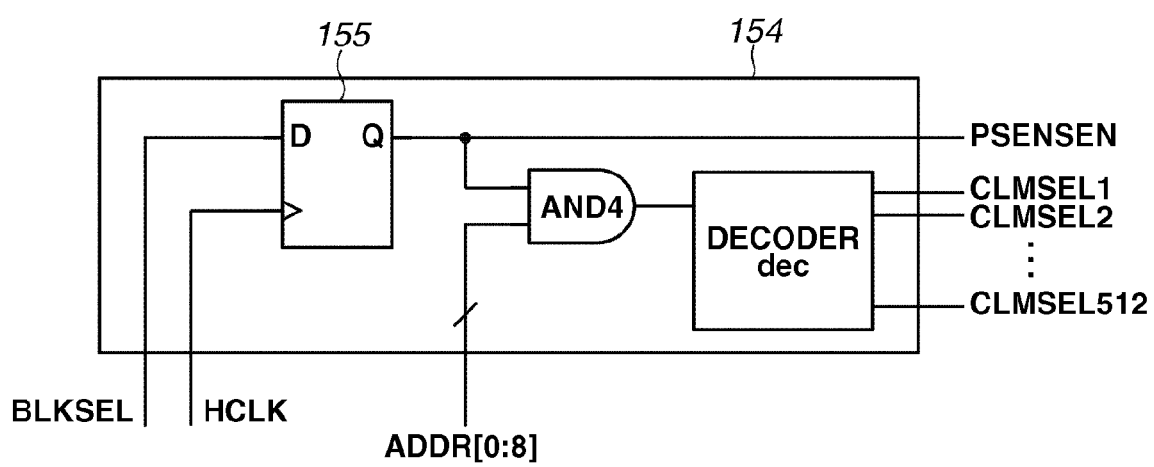
FIG. 5 is a diagram illustrating a configuration of an intrablock scanning circuit.

FIG. 5 is a diagram illustrating a configuration example of the intra-block scanning circuit 154. The intra-block scanning circuit 154 includes a flip-flop 155, an AND circuit AND4, and a decoder dec. For simplifying the diagram, only one AND circuit AND4 is illustrated. As a matter of fact, however, as many AND circuits AND4 as the number of bits in an address signal ADDR[0:8] are provided. In other words, nine AND circuits AND4 are provided in the present example. An output terminal Q of the flip-flop 155 is connected to one input of each of the nine AND circuits AND4 in common. The other input terminal of each of the nine AND circuits AND4 is supplied with one address signal ADDR[0:8]. The flip-flop 155 latches a block selection signal BLKSEL in synchronism with a reference clock HCLK. If the latched block selection signal BLKSEL is at an H level, the intra-block scanning circuit 154 brings a sense amplifier activation signal PSENSEN to an H level. In this state, if a corresponding bit in the address signal ADDR[0:8] becomes an H level, an output of the AND circuit AND4 becomes an H level. In this way, the decoder dec decodes the address signal ADDR[0:8] based on signals that are input from the nine AND circuits AND4, and brings a column selection signal CLMSELn (where n is a numeral that represents a column) corresponding to the address signal ADDR[0:8] to an H level. If the scanning of the block is finished, the block selection signal BLKSEL becomes an L level, and the sense amplifier activation signal PSENSEN and the column selection signal CLMSELn also become an L level.

Figure 6:
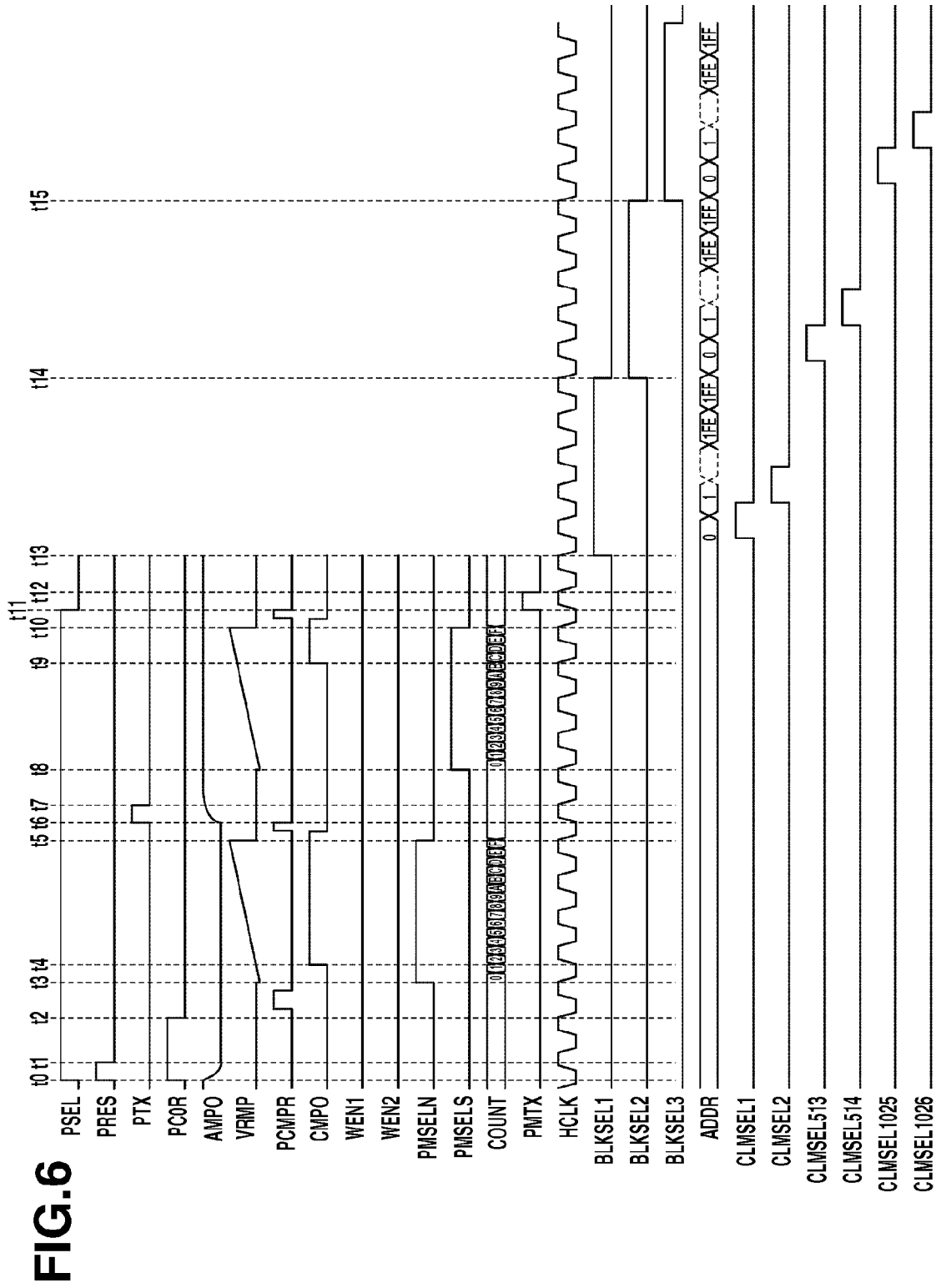
FIG. 6 is a timing diagram illustrating operation of the photoelectric conversion device.

An operation example of the photoelectric conversion device 100 will now be described. FIG. 6 illustrates an operation at the time when signals corresponding to pixels for one row are read from the three areas in the pixel array 110.

If the control signal PSEL becomes an H level at time t0, the selection transistor 118 included in each of pixels 111 on the selected row turns on and an output of the amplification transistor 117 appears on the column signal line 113.

During a period between the time t0 and time t1, the control signal PRES becomes H and the floating diffusion FD in the pixel 111 is reset by the reset transistor 116. An output corresponding to resetting the floating diffusion portion FD (hereafter referred to as pixel reset level) is output onto the column signal line 113.

During a period between the time t0 and time t2, a control signal PCOR becomes H and the pixel reset level is clamped by the input capacitance C0. Hereafter, the output of the amplification unit 120 at this time is referred to as N level.

During a period between the time t2 and time t5, the A/D conversion unit 130 converts the N level to a digital signal. Hereafter, an operation of the conversion is referred to as N conversion.

During a period between the time t2 and time t3, the control signal PCMPR becomes H, and a reference voltage (hereafter referred to as ramp reset level) generated by the reference signal generation unit 170 and the N level output from the amplification unit 120 are clamped by the capacitances C1 and C2, respectively.

At the time t3, the reference signal falls to a level lower than the ramp reset level. Over a period between the time t3 and the time t5, the reference signal rises with a constant gradient. On the other hand, as for a counter signal supplied from the counter 180, the counter 180 performs a count operation of the clock signal over a period between the time t3 and the time t5 and changes a count value successively. Over the period between the time t3 and the time t5, the control signal PMSELN is at the H level.

If the voltage of the reference signal coincides with the N level at time t4, the output CMPO of the comparison circuit COMP changes from L to H. As a result, the AND circuit AND1 included in the comparator 131 outputs a pulse having a width corresponding to a time period determined according to a delay value of the delay element DL. As a result, a counter signal corresponding to the N level is latched in the latch circuit N_latch1. The N conversion finishes at the time t5. Thereafter, the control signal PCMPR becomes the H level, and the output CMPO of the comparison circuit COMP becomes the L level.

During a period between time t6 and time t7, the control signal PTX becomes H and electric charge stored in the photodiode 114 is transferred to the floating diffusion FD. As a result, the column signal line 113 becomes a level obtained by superposing a level corresponding to a charge amount transferred to the floating diffusion FD on the pixel reset level. In keeping with this, the output of the amplification unit 120 also varies. Hereafter, an output of a column amplifier at this time is referred to as S level. Since the pixel reset level is clamped between the time t2 and the time t3, the S level becomes a difference from the pixel reset level.

During a period between time t8 and time t10, an operation similar to that during a period between the time t3 and the time t5 is performed. Hereafter, an A/D conversion operation during this period is referred to as S conversion. Furthermore, over the period between the time t8 and the time t10, the control signal PMSELS is at the H level.

If the voltage of the reference signal coincides with the S level at time t9, the output CMPO of the comparison circuit COMP changes from L to H. As a result, the AND circuit AND1 included in the comparator 131 outputs a pulse having a width corresponding to a time period determined according to a delay value of the delay element DL. As a result, a count signal corresponding to the S level is latched in the latch circuit S_latch1. The S conversion finishes at the time t10. Thereafter, the control signal PCMPR becomes the H level, and the output CMPO of the comparison circuit COMP becomes the L level.

During a period between time t11 and time t12, the control signal PMTX becomes H and digital data held in the latch circuits N_latch1 and S_latch1 are transferred to the latch circuits N_latch2 and S_latch2, respectively.

After a signal BLKSEL1 has become the H level at time t13, the address signal ADDR[0:8] changes successively. As a result, digital data based on the pixel 111 corresponding to the block output unit 150-1 are read from the latch circuits N_latch2 and S_latch2.

In the same way, digital data is read from the block output unit 150-2 after time t14, and digital data is read from the block output unit 150-3 after time t15. The block output unit 150 successively inputs the digital data stored in the latch circuits N_latch2 and S_latch2 to the signal output unit 190. The signal output unit 190 outputs a difference between the N conversion result and the S conversion result.

A read operation is performed for pixels 111 on the second row and subsequent rows as well in the same way as the foregoing description. If scanning on the pixel array 110 is thoroughly finished, image signals corresponding to one frame are obtained.

If data held in the latch circuits N_latch1 and S_latch1 are transferred respectively to the latch circuits N_latch2 and S_latch2 at the time t11 in the operation described heretofore, the latch circuits N_latch1 and S_latch1 are brought into a state in which data maybe erased. Taking notice of this point, the operation for the pixels on the first row after the time t12 can be performed in parallel with an operation for pixels on the second row beginning with the time t0. As a result, signal reading can be performed fast.

A partial read operation for reading signals from only a partial area among the three areas in the pixel array will now be described.

A case where signals are read from only pixels in a pixel array 110-3 corresponding to the block output unit 150-3 in the block output unit 150 will now be described with reference to FIG. 7.

An operation performed between the time t1 and the time t12 is the same as that in all-pixel reading, and consequently description thereof will be omitted.

At the time t13, a block selection signal BLKSEL3 becomes H and only digital data held in N_latch2 and S_latch2 corresponding to the area of the pixel array 110-3 is read into the signal output unit 190. The block selection signals BLKSEL1 and BLKSEL2 are kept at the L level, and digital data is not read from the block output units 150-1 and 150-2 corresponding to them. The read period can be shortened to approximately one third as compared with the operation illustrated in FIG. 6 by restricting an area to be subject to horizontal scanning in this way.

Figure 7:
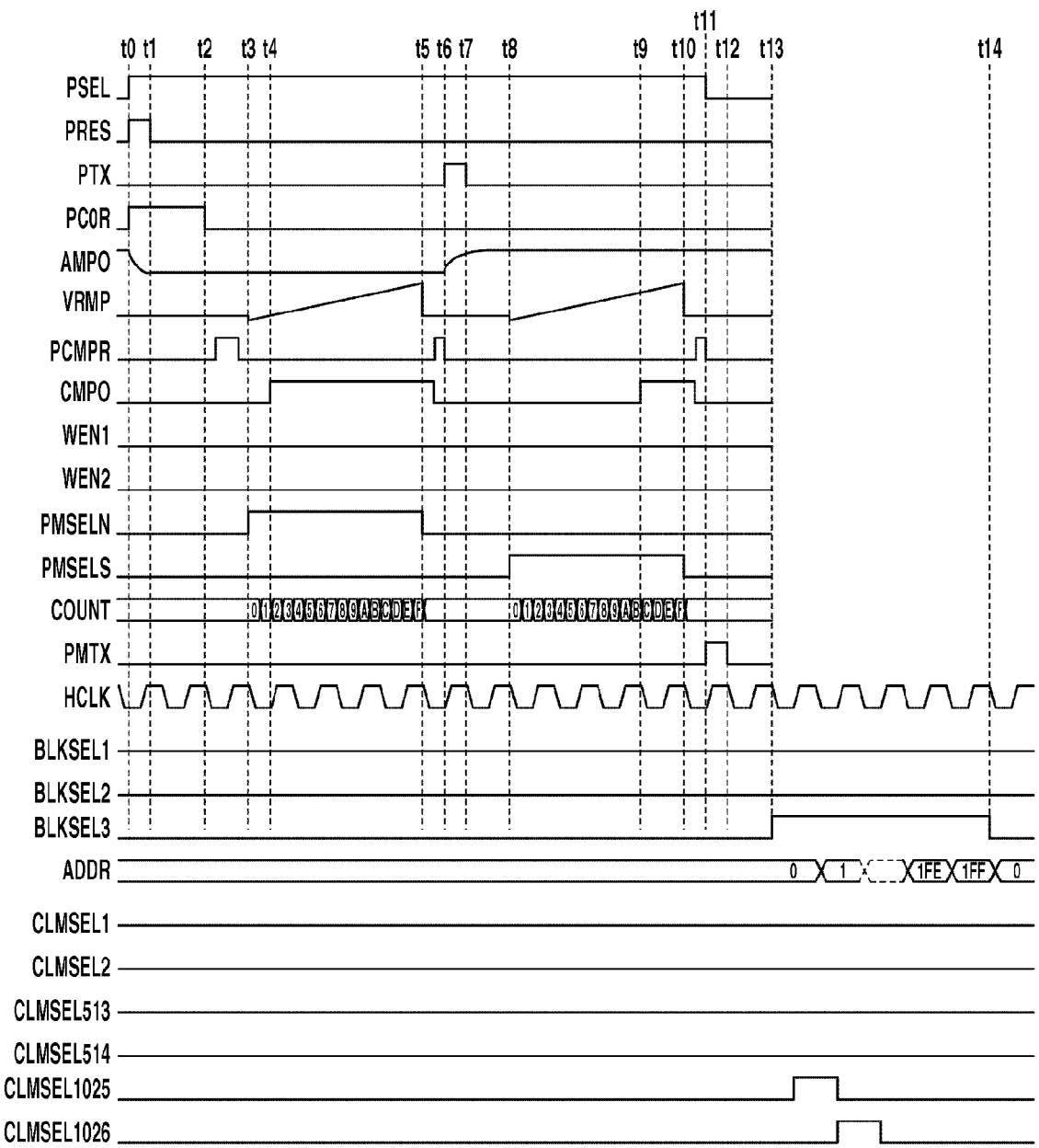
FIG. 7 is a timing diagram illustrating operation of the photoelectric conversion device in a partial read mode.

In the partial read operation illustrated in FIG. 7, only digital data of the block output unit 150-3 is read. However, it is impossible to distinguish from which block output unit 150 the output digital data originates, by watching only the signal output from the signal output unit 190. Hereafter, therefore, an operation for reading block information, which can be utilized to distinguish the block output unit, will be described with reference to FIG. 8.

In the block information read operation, the block information supply unit 160 supplies block information to the first latch circuit 132 instead of the A/D conversion result of the pixel signal in the partial read operation.

The block information in the present exemplary embodiment is stored in a block information memory 161. In the photoelectric conversion device according to the present exemplary embodiment, the block information memory 161 assumes a form of a mask read only memory (ROM), and the block information memory 161 is represented as a connection pattern between the wiring that supplies the write signals WEN1 and WEN2 and the first latch circuit 132. For example, as for the block output unit 150-1, the illustrated first latch circuits 132 of both two columns are connected to a signal line that supplies the write signal WEN1. As for the block output unit 150-2, the first column is connected to the signal line that supplies WEN2 and the second column is connected to a signal line that supplies WEN1. As for the block output unit 150-3, the first column is connected to the signal line that supplies WEN1 and the second column is connected to the signal line that supplies WEN2. The connection pattern differs depending upon the individual block. In other words, the connection pattern between the wiring that supplies the write signals and the first latch circuit 132 becomes block information, which indicates the location of the block.

In the block information read operation, an operation for reading a pixel signal from the pixel array 110 is not performed and the A/D conversion operation of the pixel signal is not performed, either.

At time t3, the signal PMSELN becomes the H level, and the latch circuit N_latch1 is brought into a state in which signal writing is accepted.

At time t16, the write signals WEN1 and WEN2 become the H level. As a result, a count value at this time is written into the two latch circuits N_latch1 included in the first latch circuit 132 for the block output unit 150-1. The count value at this time is zero. In the same way, zero is written into two latch circuits N_latch1 included in the first latch circuit 132 for each of the block output units 150-2 and 150-3.

At time t5, the signal PMSELN becomes the low level. In addition, at time t8, the signal PMSELS becomes the H level. As a result, the latch circuits S_latch1 are brought into a state in which signal writing is accepted.

At time t17, the write signal WEN1 becomes the H level. As a result, a count value at this time is written into the two latch circuits S_latch1 included in the first latch circuit 132 for the block output unit 150-1. The count value at this time is zero. In the same way, 0 is written into the right-side latch circuit S_latch1 included in the first latch circuit 132 for the block output unit 150-2, and 0 is written into the left-side latch circuit S_latch1 included in the first latch circuit 132 for the block output unit 150-3.

After the count value has become F, the write signal WEN2 becomes the H level at time t18. As a result, F is written into the left-side latch circuit S_latch1 in the first latch circuit 132 for the block output unit 150-2. In the same way, F is written into the right-side latch circuit S_latch1 in the first latch circuit 132 for the block output unit 150-3. Nothing is written into the first latch circuit 132 for the block output unit 150-1 at this timing, because the first latch circuit 132 for the block output unit 150-1 is not connected to a wiring supplying the write signal WEN2.

As a result, arranging data written into the latch circuit for the block output unit 150-1 in the order of N_latch1, S_latch1, N_latch1, and S_latch1 yields 0000. In the same way, the block output unit 150-2 is brought into a state in which 0F00 is written, and the block output unit 150-3 is brought into a state in which 000F is written. These pieces of data become block information.

After the signal PMSELS has become the L level at time t10, the signal PMTX becomes the H level during a period between time t11 and t12. As a result, the data held in the first latch circuit 132 is transferred to the second latch circuit 133.

The signal BLKSEL3 becomes the H level at time t13, and the address signal ADDR[0:8] changes successively. As a result, data held in the second latch circuit 133 for the block output unit 150-3 is transmitted to the signal output unit 190 via the OR circuits 153 in other block output units 150-2 and 150-1. The signal output unit 190 obtains 000F at this time.

Block information is set to become a value unique to each block. It is possible to distinguish from which area in the pixel array a signal is read, by storing the block information into a memory provided in the signal output unit or a subsequent stage and conducting the block information read operation illustrated in FIG. 8 prior to the partial read operation described with reference to FIG. 7.

An application example in which the block information read operation and the partial read operation are executed in order will now be described. The photoelectric conversion device 100 has two operation modes, i.e., the partial read mode illustrated in FIG. 7 and the block information read mode illustrated in FIG. 8 besides the operation mode illustrated in FIG. 6.

An example in which only data in the pixel array 110-3 (block 3) in the photoelectric conversion device 100 illustrated in FIG. 1 is updated fast in cases where there is a target object 400 in the pixel array 110-3 (block 3) will now be described.

Figure 9:
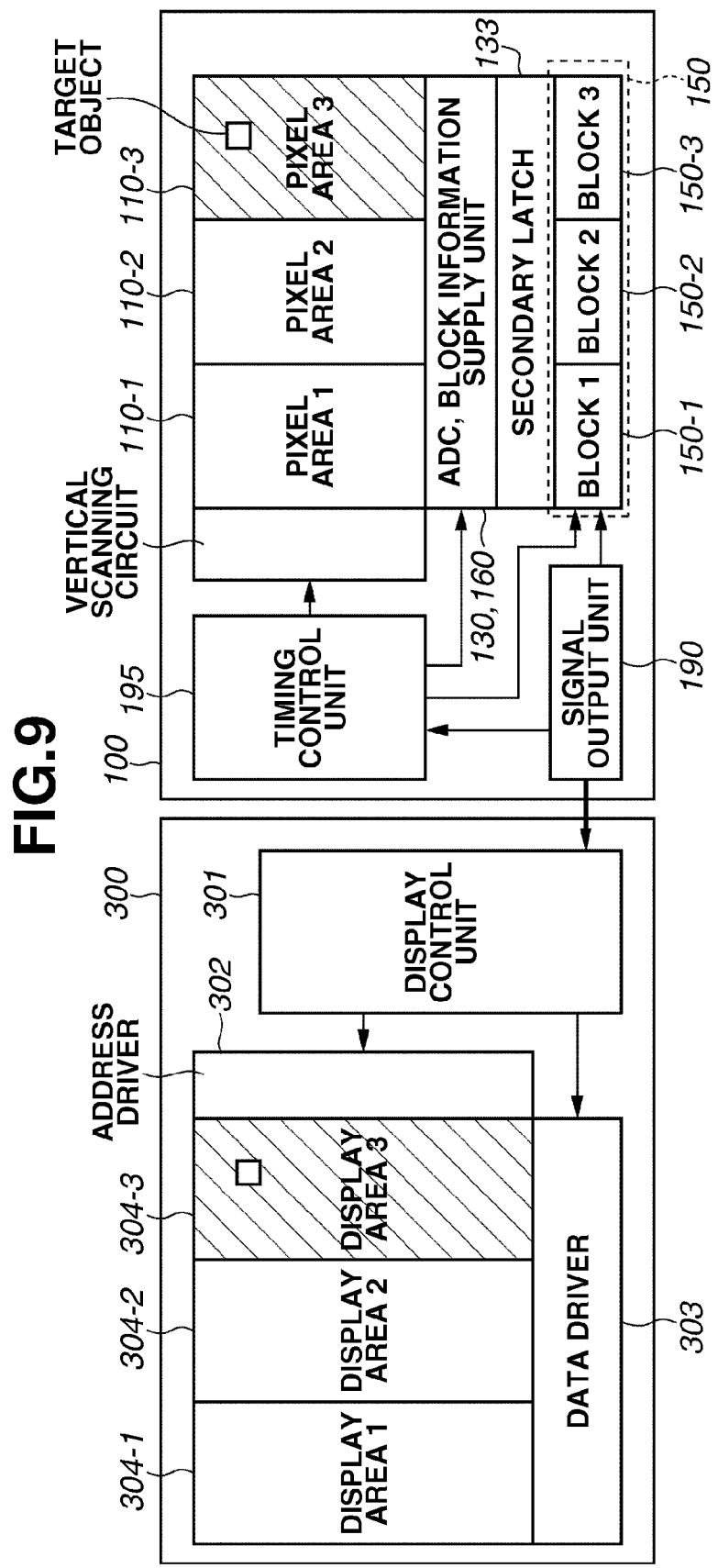
FIG. 9 is a schematic diagram illustrating a configuration of an image display system.

FIG. 9 is a schematic diagram illustrating a configuration example of an image display system formed by connecting the photoelectric conversion device 100 described with reference to FIG. 1 to a display device 300. For brevity of description, only the pixel array 110 and the signal output unit 190 in the configuration of the photoelectric conversion device 100 are illustrated. The display device includes a display control unit 301, an address driver 302, a data driver 303, and a display area 304. The display area 304 is illustrated to be divided into display areas 304-1, 304-2, and 304-3 correspondingly with the pixel arrays 110-1, 110-2, and 110-3, respectively. The address driver 302 indicates a row in the display area to be accessed. The data driver 303 indicates a column in the display area to be accessed. The display control unit 301 controls the display area 304 and displays an image by controlling the address driver 302 and the data driver 303.

Figure 10:
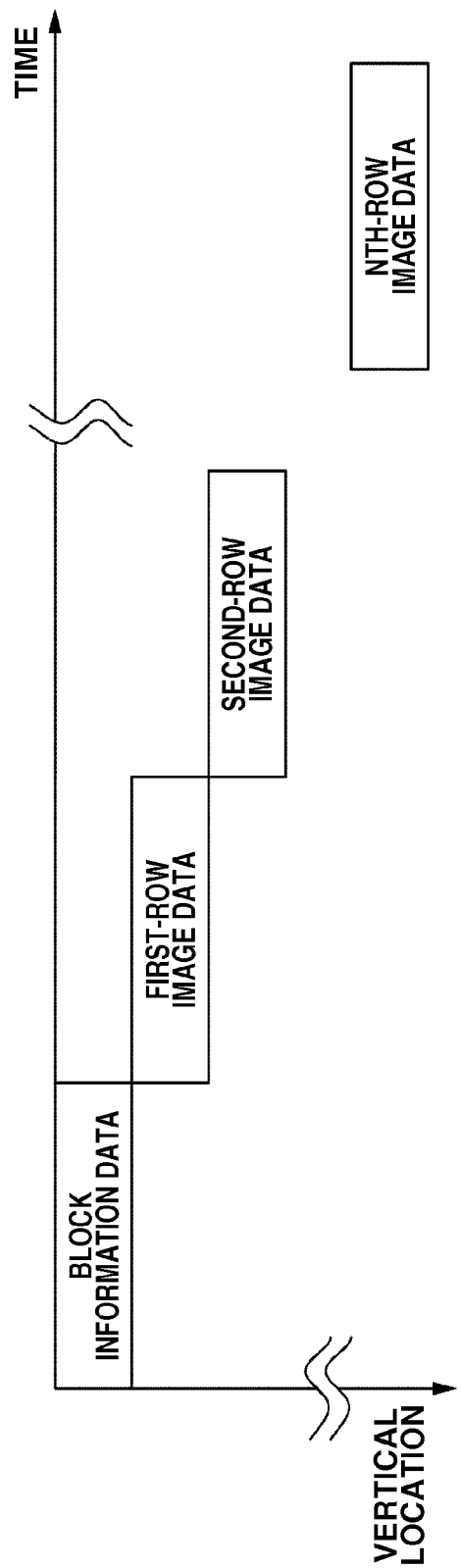
FIG. 10 is a timing diagram illustrating operation of the image display system.

When updating only an image in the pixel array 110-3 corresponding to the block 3, image data in the block 3 is output by performing a partial read operation after outputting block information for the block 3 as illustrated in FIG. 10. Upon reading block information located at head out of data output from the photoelectric conversion device 100, the display device 300 sets drive conditions for the address driver 302 and the data driver 303 based on the block information (000F in this case) to cause the display control unit 301 to update display in the display area 3 (304-3). Display is updated only in the display area 3 by displaying image data sent out from the photoelectric conversion device 100 in the wake of the block information, in the display area 3 (304-3). As a result, the area accessed by the data driver 303 becomes approximately one third of the whole. Accordingly, it becomes possible to capture an image of the target object 400 illustrated in FIG. 9 and display the image at a high frame rate. On the other hand, there is no target object 400 in the display area 1 (304-1) and the display area 2 (304-2), and it is sufficient if there is image information as the background. Accordingly, the display area 1 (304-1) and the display area 2 (304-2) may be updated at a lower frame rate as compared with the display area 3. In that case, it is possible to conduct a partial read operation for the pixel array 110-1 or the pixel array 110-2 at a lower frequency as compared with the pixel array 110-3. Even in cases where the target object 400 moves fast in the image pickup plane, it is possible to obtain an image while following the movement owing to the fact described heretofore.

According to the photoelectric conversion device in the present exemplary embodiment, it is possible to send location information of a pixel area in which image data is obtained as described heretofore. In the present exemplary embodiment, an example in which the pixel array 110 and the block output unit 150 corresponding to the pixel array are divided into three sections has been described. However, it is possible to obtain an effect if the number of sections is at least two and is less than the entire number of pixel columns.

According to the present exemplary embodiment, it is possible to implement imaging and display of the target area at a high frame rate by updating a part of the display device based on location information of the read block sent from the photoelectric conversion device.

Furthermore, in the present exemplary embodiment, it is possible to use a memory such as a mask ROM or an electrically erasable programmable read only memory (EEPROM) for the block information memory. In addition, it is also possible to use the block information supply unit 160 as the A/D conversion unit 130 and the second latch circuit 133. In other words, it is possible in the A/D conversion unit 130 to control the analog signal input to the comparison circuit COMP, and the reference signal supplied from the reference signal generation unit 170 to write a predetermined count value into the first latch circuit 132. In this case, the block information supply unit 160 includes a circuit supplying an analog signal input to the comparator, the reference signal generation unit 170, and the comparison circuit COMP. Besides, it is also possible to write the block information into the memory by adding at least one of a set terminal and a reset terminal to the second latch circuit 133. Furthermore, it is also possible to add information other than the location information such as, for example, correction data to the block information memory 161.

The configuration of the photoelectric conversion device 100 is not restricted to that described heretofore. For example, it is possible to omit the amplification units 120, or it is possible to omit the second latch circuits 133.

A second exemplary embodiment, which is another exemplary embodiment according to the present invention, will now be described.

Figure 11:
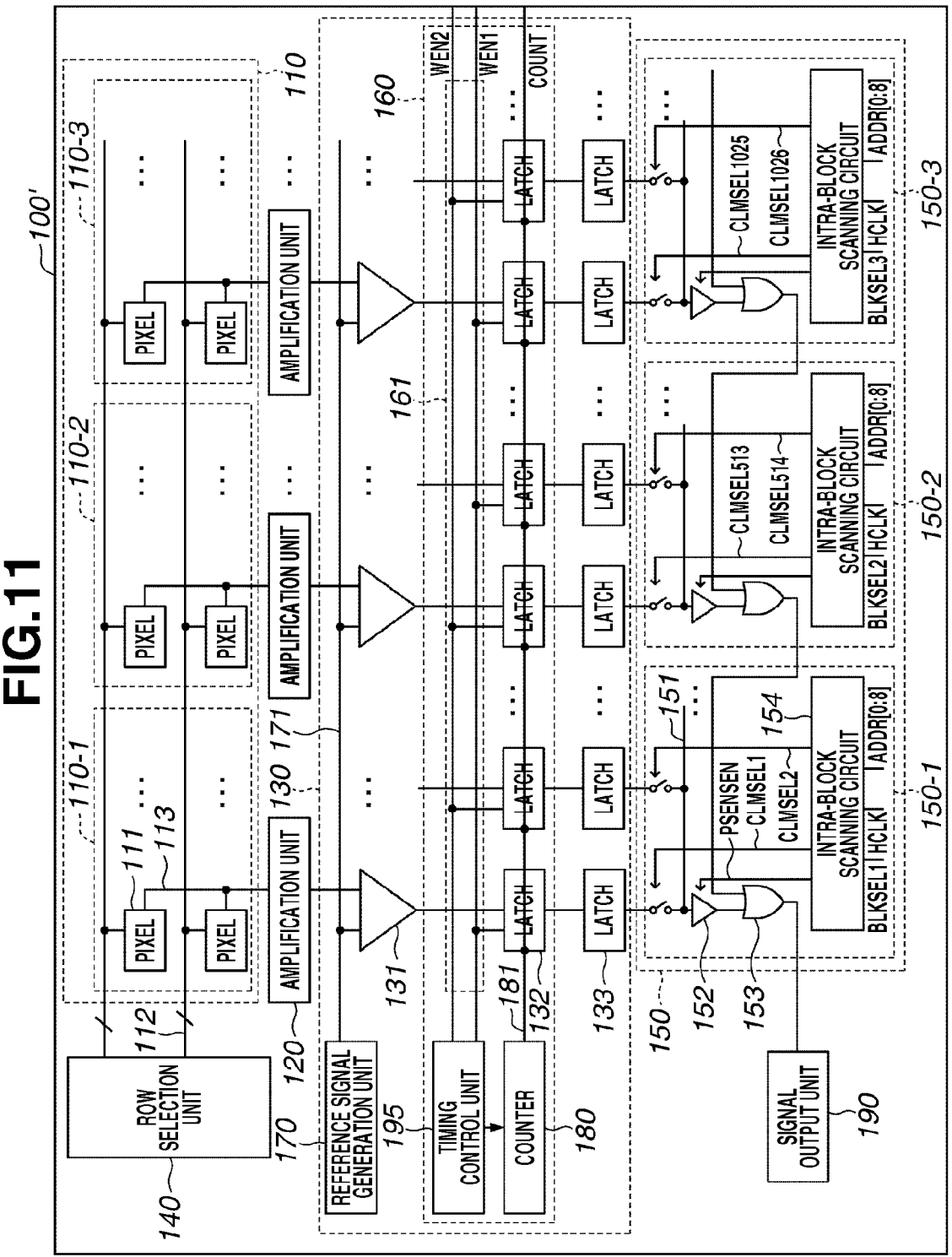
FIG. 11 is a block diagram illustrating a configuration of a photoelectric conversion device according to a second exemplary embodiment.

FIG. 11 is a block diagram illustrating a configuration example of a photoelectric conversion device 100' according to the present exemplary embodiment. The photoelectric conversion device 100' differs from the photoelectric conversion device 100 illustrated in FIG. 1 in the connection pattern between the wiring that transmits the write signals WEN1 and WEN2 and the first latch circuits 132. In the present exemplary embodiment, the connection pattern for the first latch circuits corresponding to the pixel array 110-2 differs from that for the first latch circuits corresponding to the pixel arrays 110-1 and 110-3. Therefore, reading the block information in order from the block output units 150-1 to 150-3 yields periodic data. It is possible to determine whether there is a failure in the circuit by utilizing this fact.

Figure 12:
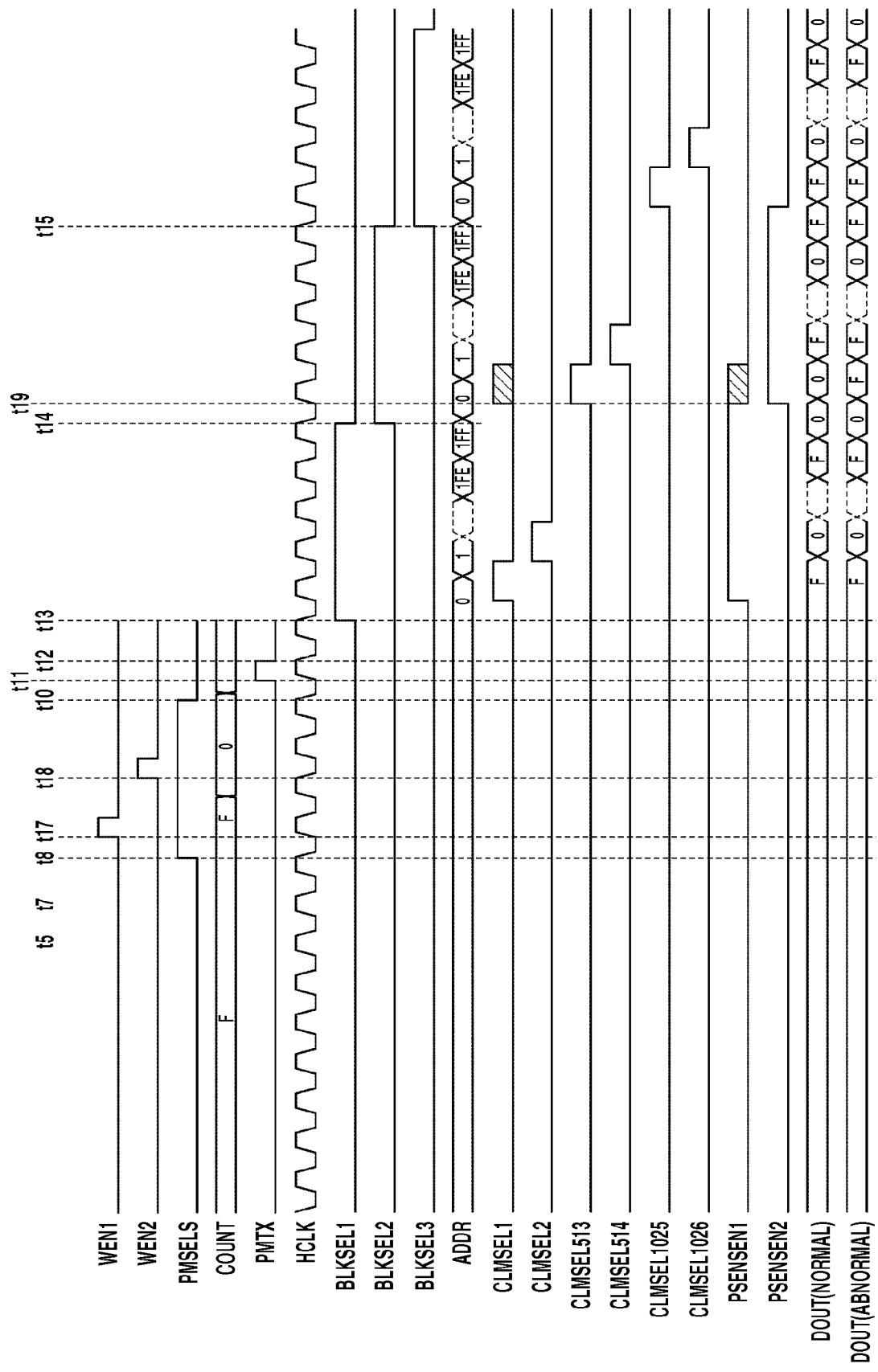
FIG. 12 is a timing diagram illustrating operation of the photoelectric conversion device in an testing mode.

An operation in an testing mode will now be described with reference to FIG. 12. In the testing mode, no signals are read from the pixel array 110. Therefore, timing concerning the pixel control signals and the reference signal is omitted. Furthermore, for brevity of description, only block information written into the latch circuit S_latch1 in each column is focused on.

Figure 8:
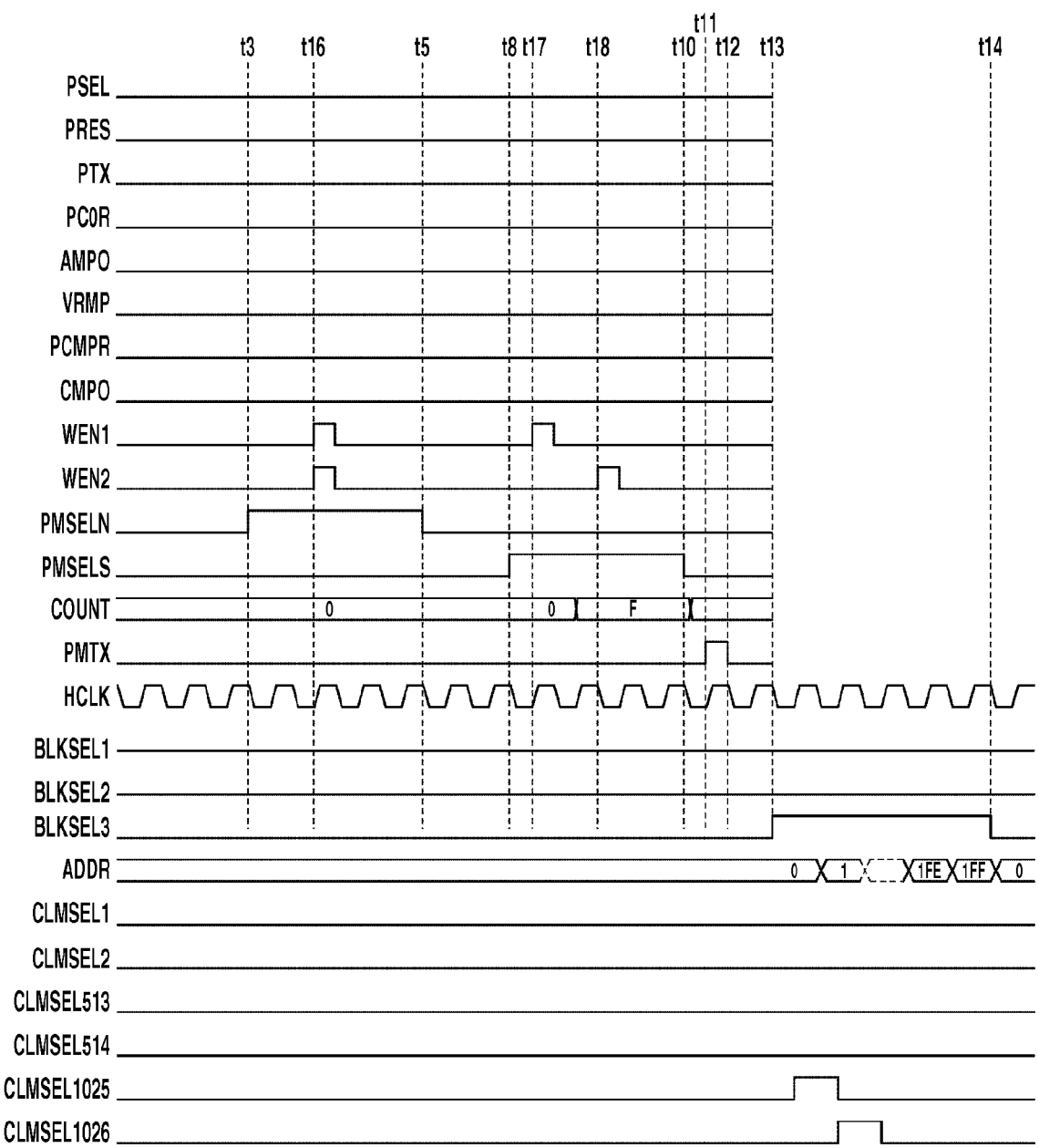
FIG. 8 is a timing diagram illustrating operation of the photoelectric conversion device in a block information read mode.

It is possible to make an operation during a period between time t8 and time t13 the same as the block information read operation illustrated in FIG. 8. Therefore, description thereof will be omitted.

By the time t13, two latch circuits S_latch2 for each of the block output units 150-1 and 150-3 store F0 in order from the left side as block information. On the other hand, two latch circuits S_latch2 for the block output unit 150-2 store 0F in order from the left side as block information.

The block output units 150 are caused to output data stored in the latch circuits S_latch2 in order. If there is no failure, data F0 and 0F appear alternately from the signal output unit 190. Alternate appearance of the data F0 and 0F is set into a circuit memory provided in a subsequent stage as an expected value. As a result, a circuit provided in a subsequent stage compares data output from the signal output unit 190 with the expected value. In case of coincidence, the user can determine that there is no failure.

It is supposed that the flip-flop 155 included in the intra-block scanning circuit 154 in the block output unit 150-1 has a failure. Further, it is supposed that a D input of the flip-flop 155 is not updated even if the clock signal HCLK is input.

During a period between the time t13 and time t14, the signal BLKSEL1 becomes the H level. During the period, the address signal ADDR[0:8] changes successively, resulting in scanning of the latch circuits in the block output unit 150-1. As a result, the block output unit 150-1 alternately outputs data F0 and 0F.

Unless data in the flip-flop 155 in the block output unit 150-1 is updated during a period between the time t14 and time t19, the control signal PSENSEN1 remains the H level even at the time t19. As a result, the signal CLMSEL1 becomes the H level at the time t19. The OR circuit 153 included in the block output unit 150-1 is expected to output data 0 in a normal state. Nevertheless, the OR circuit 153 outputs data F in this state. In FIG. 12, DOUT (ABNORMAL) represents this situation. The circuit in the subsequent stage determines that there is a failure because the signal output unit 190 outputs data different from the expected value 0. It is also possible to provide a correction unit in the signal output unit 190 or in a circuit in a subsequent stage and cause the correction unit to correct data in the block output unit having a failure in cases where it is determined that a failure has occurred in the photoelectric conversion device 100'. On the other hand, in cases where the expected value coincides with the block information output from the photoelectric conversion device, i.e., it is determined that there are no failures, an imaging system is manufactured by assembling the photoelectric conversion device into a casing together with a signal processing unit which will be described below.

The failure described above is a phenomenon in which data belonging to adjacent block output units 150 are confused. If the context of adjacent block output units 150 can be distinguished, therefore, it can be determined whether there is a failure. If the same block information is alternately recorded in odd numbered block output units 150 and even numbered block output units 150 from the left, therefore, it can be determined in the present example whether there is a failure. By providing each block output unit with unique block information, it is possible to determine whether there is a failure for each block, execute the operation of the block information read mode described in the first exemplary embodiment, and distinguish a source area of data at time in the partial read mode.

According to the photoelectric conversion device in the present exemplary embodiment described heretofore, it becomes possible to test the photoelectric conversion device.

Figure 13:
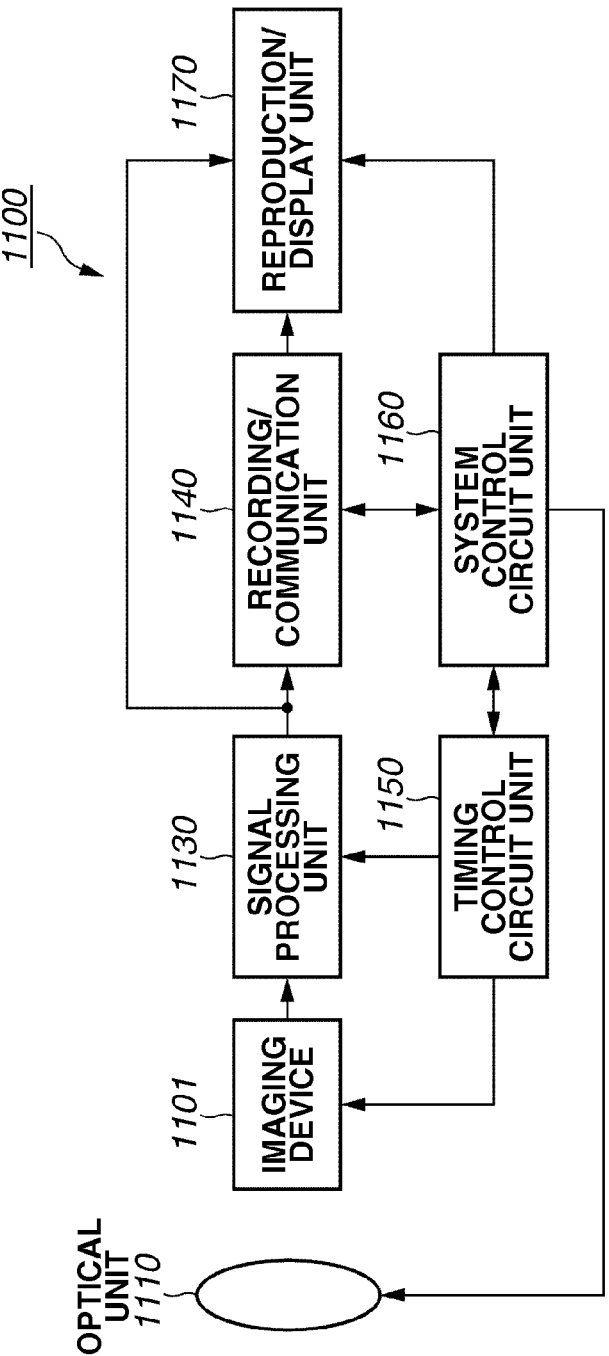
FIG. 13 is a block diagram illustrating a configuration of an imaging system.

A third exemplary embodiment, which is another exemplary embodiment according to the present invention, will now be described. FIG. 13 schematically illustrates an imaging system.

An imaging system 1100 includes, for example, an optical unit 1110, an imaging device 1101, a signal processing unit 1130, a recording/communication unit 1140, a timing control circuit unit 1150, a system control circuit unit 1160, and a reproduction/display unit 1170. As for the imaging device 1101, the photoelectric conversion device 100 or 100' described in foregoing exemplary embodiments is used. For example, the signal processing unit 1130 may have the function of the circuit provided in the subsequent stage of the photoelectric conversion device described in the second exemplary embodiment.

The optical unit 1110 which is an optical system including a lens forms an image of light from an object, on the pixel array having a plurality of pixels arranged in a two-dimensional form in the imaging device 1101, and forms an image of the object. The imaging device 1101 outputs a signal depending upon light, which forms an image on the pixels, at timing based upon a signal supplied from the timing control circuit unit 1150.

The output signal of the imaging device 1101 is input to the signal processing unit 1130 which is a video signal processing unit. The signal processing unit 1130 performs processing such as correction on an input electric signal according to a method determined by a program or the like. The signal processing unit 1130 transmits a signal obtained by the processing to the recording/communication unit 1140 as image data. The recording/communication unit 1140 transmits a signal for forming an image to the reproduction/display unit 1170 and causes the reproduction/display unit 1170 to reproduce and display a moving picture or a still image. Furthermore, the recording/communication unit 1140 receives a signal from the signal processing unit 1130 and performs communication with the system control circuit unit 1160 as well. Further, the recording/communication unit 1140 also performs an operation for recording a signal to form an image, on a recording medium (not illustrated).

The system control circuit unit 1160 comprehensively controls the operation of the imaging system. The system control circuit unit 1160 controls drive of the optical unit 1110, the timing control circuit unit 1150, the recording/communication unit 1140, and the reproduction/display unit 1170. Furthermore, the system control circuit unit 1160 has a storage device, which is, for example, a recording medium (not illustrated). The storage device stores a program required to control the operation of the imaging system. Furthermore, the system control circuit unit 1160 supplies a signal for switching a drive mode according to, for example, a user's operation, in the imaging system. Specific examples are a change of a row to be read or a row to be reset, a change of an angle of view caused by electronic zooming, and a shift of the angle of view caused by electronic image stabilization.

The timing control circuit unit 1150 controls drive timing of the imaging device 1101 and the signal processing unit 1130 based on control executed by the system control circuit unit 1160, which is a control unit.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-220387 filed Oct. 2, 2012, which is hereby incorporated by reference herein in its entirety.

What is claimed is:

1. A photoelectric conversion device comprising:
a pixel array including a plurality of pixels arranged in a matrix;
a plurality of blocks including a plurality of pairs, each of the pairs including a comparator provided correspondingly with a column in the pixel array and a memory provided correspondingly with the comparator; and
a block information supply unit that includes a signal line group including a plurality of single lines and is configured to supply block information to the plurality of memories included in the plurality of blocks, the block information being information for distinguishing a signal read from one block among the plurality of blocks and a signal read from another block, wherein the plurality of memories included in one of the plurality of blocks are connected to the signal line group with a pattern different from that for the plurality of memories included in another one of the plurality of blocks.

2. The photoelectric conversion device according to claim 1, wherein the block information supplied to adjacent blocks among the plurality of blocks is different from each other.

3. The photoelectric conversion device according to claim 1, wherein the block information is information unique to each of the plurality of blocks.

4. The photoelectric conversion device according to claim 1, further comprising a plurality of block output units respectively provided correspondingly with the plurality of blocks, and wherein each of the plurality of block output units outputs data held in the plurality of memories included in an associated block.

5. The photoelectric conversion device according to claim 4, wherein each of the plurality of block output units includes a selective-output unit configured to selectively output any of data held in the plurality of memories included in the associated block and other blocks.

6. The photoelectric conversion device according to claim 1, wherein the photoelectric conversion device operates to be switchable between a partial read mode for reading a signal from the pixels in a partial area in the pixel array and a block information read mode for reading the block information, and wherein the photoelectric conversion device successively executes an operation in the block information read mode and an operation in the partial read mode.

7. An imaging system comprising:
the photoelectric conversion device according to claim 1; and
a signal processing unit,
wherein the signal processing unit compares a previously held expected value with the block information output from the photoelectric conversion device.

8. An testing method for a photoelectric conversion device, the photoelectric conversion device including:
a pixel array including a plurality of pixels arranged in a matrix;
a plurality of blocks including a plurality of pairs, each of the pairs including a comparator provided correspondingly with a column in the pixel array and a memory provided correspondingly with the comparator; and
a block information supply unit that includes a signal line group including a plurality of single lines and is configured to supply block information for distinguishing between a signal read from one block among the a plurality of blocks and a signal read from another block, to the a plurality of memories included in the plurality of blocks, wherein the plurality of memories included in one of the plurality of blocks are connected to the signal line group with a pattern different from that for the plurality of memories included in another one of the plurality of blocks, the testing method comprising:
comparing a preset expected value with the block information output from the photoelectric conversion device; and
determining whether the expected value coincides with the block information.

9. A manufacturing method for an imaging system, the method comprising:
assembling a photoelectric conversion device for determining that an expected value coincides with block information during a testing method according to the photoelectric conversion device and testing method of claim 8, and a signal processing unit configured to process a signal output from the photoelectric conversion device, into a casing.

* * * * *